United States Patent [19]

Heisson

[11] Patent Number: 4,877,261
[45] Date of Patent: Oct. 31, 1989

[54] FLUID WASTE TRANSPORTER

[76] Inventor: Gary J. Heisson, 86 Rockland Rd., Auburn, Mass. 01501

[21] Appl. No.: 213,777

[22] Filed: Jun. 30, 1988

[51] Int. Cl.⁴ .............................................. B62B 1/10
[52] U.S. Cl. .................................. 280/47.26; 210/464; 220/1 C
[58] Field of Search ............... 280/47.26, 47.24, 47.27, 280/79.2, 47.34; 220/1 C; 210/464, 498; 184/1.5

[56] References Cited

U.S. PATENT DOCUMENTS

| | | | |
|---|---|---|---|
| 1,584,175 | 5/1926 | Irons | 220/1 C |
| 3,007,699 | 11/1961 | Taylor | 280/47.17 |
| 4,319,762 | 3/1982 | Streit et al. | 210/464 |
| 4,362,309 | 12/1982 | Stamper | 280/47.26 |
| 4,607,857 | 8/1986 | LeSage et al. | 280/47.26 |
| 4,635,950 | 1/1987 | Le Sage et al. | 280/47.26 |
| 4,778,191 | 10/1988 | Heisson | 280/47.26 |

FOREIGN PATENT DOCUMENTS 141474 7/1953 Sweden .............................. 280/47.26

*Primary Examiner*—David M. Mitchell
*Attorney, Agent, or Firm*—Morse, Altman, Dacey & Benson

[57] ABSTRACT

An improved fluid waste transporter is disclosed designed temporarily to receive and hold and, when full, to transport and unload hot waste oils and the like into a main disposal tank. The improved fluid waste transporter is essentially a hollow elongated wheeled container provided with a chute. It features a baffle screen between the container the chute. The baffle screen is removable in one embodiment and is both removable and pivotable in another embodiment. Preferably, a side of the chute incorparates a fill shot. Preferably, the wheels of the elongated container are secured thereto on axles that are non-rotatably mounted in flanges projecting from the container. The transporter has two handles, one at each of its ends. A first handle adjacent the chute preferably is of circular construction and made of wood, plastic and/or natural or synthetic rubber. A second handle, disposed at the wheeled end, preferably is secured to the container via a pair of flanges attached thereto. Preferably, the flanges mount both the wheels and the second handle.

25 Claims, 4 Drawing Sheets

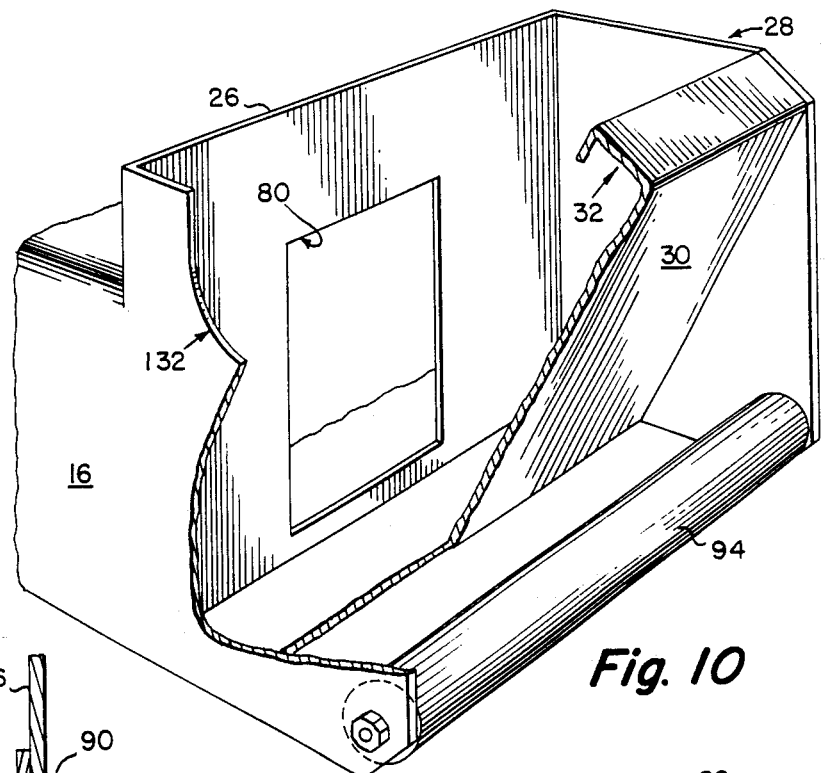
Fig. 10
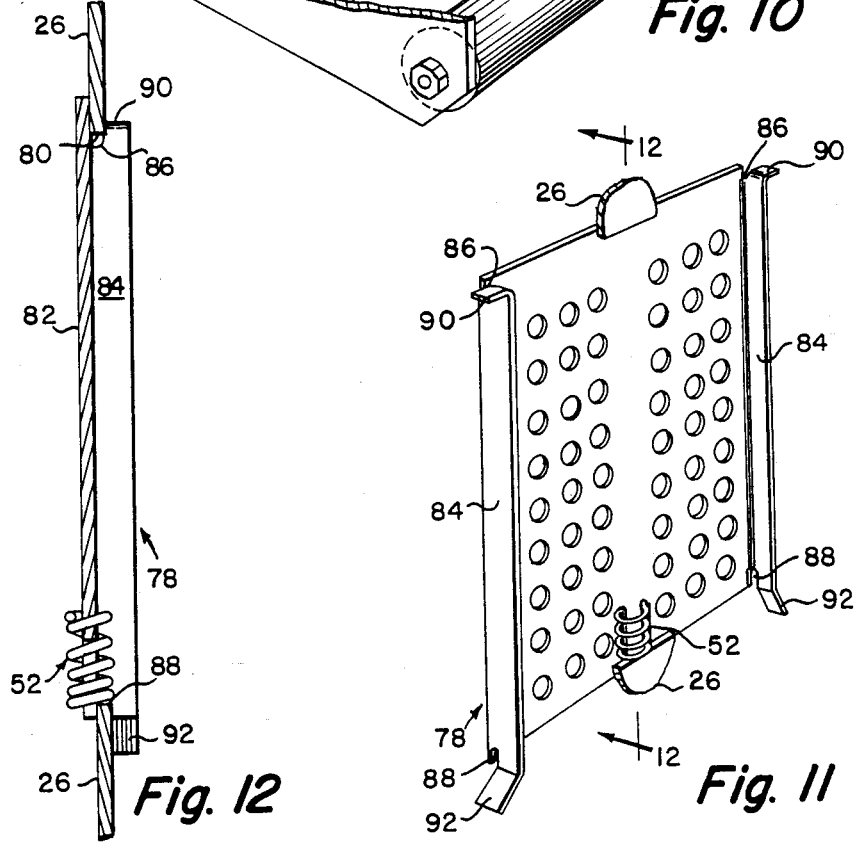
Fig. 12
Fig. 11

4,877,261

FLUID WASTE TRANSPORTER

BACKGROUND OF THE INVENTION

1. Field of the Invention

The present invention relates generally to waste transporters and, more particularly, to an improved fluid waste transporter designed to receive and hold and, when full, to transport and unload hot waste oils and the like from one site to another.

2. The Prior Art

Some restaurants and especially fast food restaurants use huge fryers. The fryers generate not only food but its waste product: hot fats and greases. The waste hot fats and greases cannot be disposed via the conventional drainage system. Restaurants provide large disposal tanks for this purpose, usually located outside and in the back of the establishment. Conventional pails are unsafe for the task of receiving and transporting the hot fats and greases from the inside cooking site to the outside disposal tank site. The need for safe handling of the hot fats and greases has spurred the development of hot fat transporting vehicles. See the U.S. Pat. No. 4,635,950 to Le Sage et al, entitled "Transportable Hot Fat Container," granted Jan. 13, 1987. See also Swedish Pat. No. 141,474. I also have addressed this need in a co-pending and recently allowed U.S. patent application, Ser. No. 051,718, filed May 20, 1987, Group 316, entitled "Waste Transporter" now U.S. Pat. No. 4,778,191, granted Oct. 18, 1988. This application represents an improvement in the structure of the device disclosed and claimed in said copending application, Ser. No. 051,718 now U.S. Pat. No. 4,778,191, granted Oct. 18, 1988.

SUMMARY OF THE INVENTION

It is a principal object of the present invention to overcome disadvantages of prior art devices by providing an improved fluid waste transporter which enhances the safe handling and transporting of hot waste oils, fats and greases.

More specifically, it is an object of the present invention to provide an improved fluid waste transporter essentially comprising a hollow elongated wheeled container provided with an integral chute. A baffle screen is removably disposed in the fluid waste transporter, separating the hollow elongated container proper from the chute. In another embodiment, the baffle screen is mounted both pivotably and removably therein. Preferably, a side of the chute incorporates a fill slot in operative association with the pivotable screen to accommodate a low entry spout that may or may not also convey hot fluids containing debris of a size greater than the apertures formed in the baffle screen. Preferably, the wheels of the elongated container are secured thereto as being rotatable on axles that are themselves non-rotatably mounted in flanges projecting forward of the container. The fluid waste transporter preferably has two handles, one at each of its ends to facilitate both the wheeling thereof between sites as well as the unloading thereof into a disposal tank, with the chute acting as a fulcrum, observe FIG. 5 of my said copending application Ser. No. 051,718. A first handle disposed adjacent the chute preferably is of circular construction and made of wood, plastic, or natural r synthetic rubber or a combination thereof. A second handle disposed at the wheeled end preferably is secured to the elongated container with the aid of a pair of flanges attached to the closed end of the container and projecting forward therefrom. Preferably, the flanges are designed to mount both the wheels and the second handle to the elongated container. In one embodiment, the second handle is shaped as a U-shaped member, preferably covered with a plastic and/or rubber coating. In another embodiment, the second handle preferably is of circular cross section and made of wood, plastic or an elastomeric material or a combination thereof. The flanges in one embodiment simply project like ears from the container. In another embodiment, the flanges are S-shaped, with their wider portions mounting the wheels and with their narrower portions mounting the second handle therebetween.

Other objects of the present invention will in part be obvious and will in part appear hereinafter.

The invention accordingly comprises the improved fluid waste transporter of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 10 is a view similar to FIG. 2 but without a baffle screen and with a different sized opening therein;

FIG. 11 is a perspective view of a baffle screen designed to be secured in the opening of the improved fluid waste transporter shown in FIG. 10;

FIG. 12 is a vertical section, on an enlarged scale, along the line 12—12 of FIG. 11;

DETAILED DESCRIPTION OF THE PREFERRED EMBODIMENT

Figure 1:
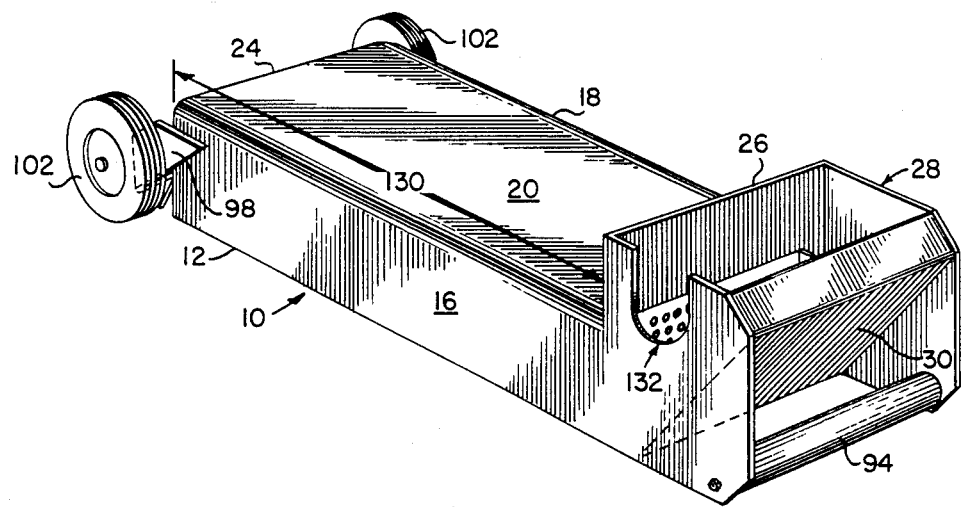
FIG. 1 is a perspective view of an improved fluid waste transporter embodying the invention.

In general, the present invention relates to waste transporters and, more specifically, to an improved fluid waste transporter 10 illustrated in FIG. 1 and used especially in fast food restaurants to receive, hold and when full, to transport and unload hot waste oils, fats and greases from the cooking area to a disposal tank. The fluid waste transporter 10 is an improvement in the structure of a similar device disclosed and claimed in my said copending U.S. patent application, Ser. No. 051,718, filed May 20, 1987, entitled "Waste Transporter." Both devices are essentially hollow elongated wheeled containers provided with a chute. The similarities end there, however. Practical experience in restaurants using the prior device of my said application has demonstrated the need for improvements therein, as will be more evident from below, not disclosed and claimed in my said prior application.

The improved fluid waste transporter 10 is an elongated metal container 12 with a hollow interior 14 enclosed by a pair of side walls 16 and 18, a pair of top and bottom walls 20 and 22, a solid end wall 24 at its front end and with a centrally open end wall 26 at the other end. The container 12 preferably is made of stainless steel or aluminum or like suitable metal. The elongated metal container 12 is provided with a chute 28 formed by the pair of side walls 16 and 18, the centrally open end wall 26 and a front side 30 disposed at an angle to the centrally open en wall 26. The free edge of the front side 30 of the chute 28 terminates in a reentrant lip 32. Except for this reentrant lip 32, the chute 28 is open at the top. The centrally open end wall 26 is provided with a central opening 34 communicating with the hollow interior 14 of the elongated container 12. Preferably, the central opening 34 is of rectangular shape, formed with parallel opposed top and bottom edges 36 and 38 and parallel opposed left and right sides 40 and 42. The particular size of the central opening 34 basically is dictated by customer requirements.

Figure 2:
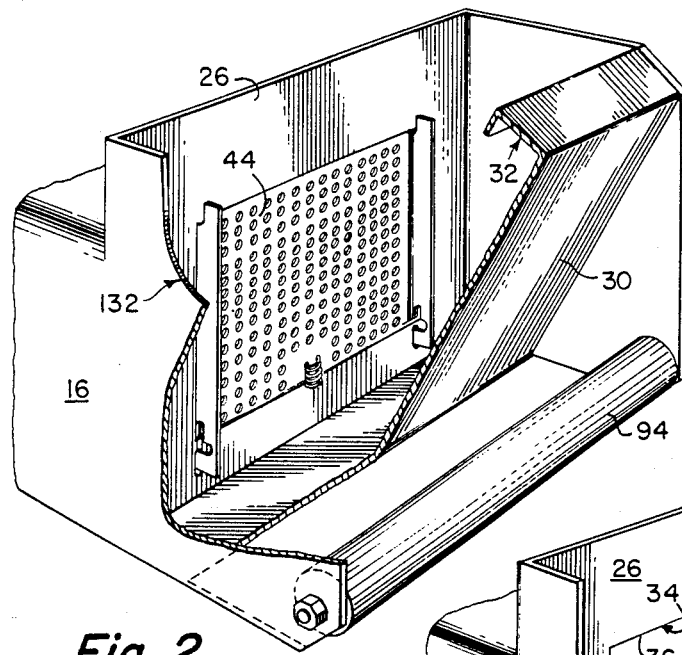
FIG. 2 is an enlarged fragment of the improved fluid waste transporter of FIG. 1, with parts broken away.

A perforated partition, such as an illustrated baffle screen 44, is mounted in the central opening 34. In the embodiment illustrated in FIGS. 1-3, the baffle screen 44 is mounted therein both removably and pivotably, while in the second embodiment illustrated in FIG. 10, the perforated partition is mounted therein only removably.

Figure 3:
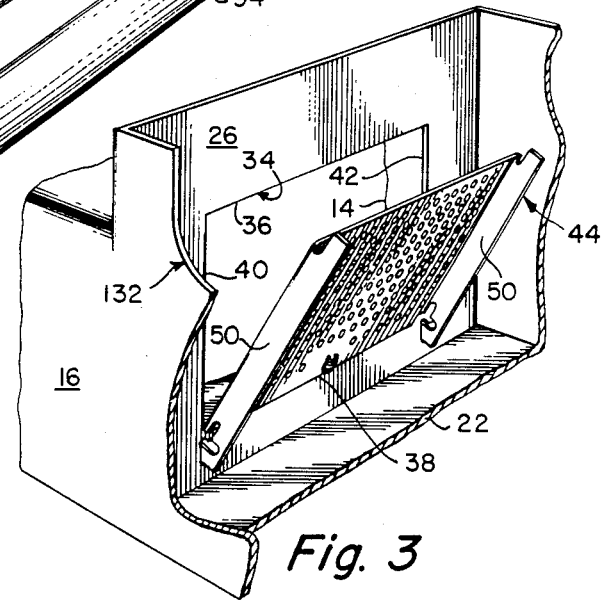
FIG. 3 is a view similar to FIG. 2 but showing a part thereof, a baffle screen, in a different operative position.

The baffle screen 44 is formed with a flat plate portion 48, provided with a plurality of perforations 46, and a pair of integral side shoulders 50,50 projecting normal thereto. Spring means 52, provided in the bottom center of the flat plate portion 48 thereof, is designed to lock the baffle screen 44 in its normally closed operating position, illustrated in FIGS. 1 and 2. A second pivotably open operating position of the baffle screen 44 is illustrated in FIG. 3.

The feature of both removably and pivotably mounting the baffle screen 44 in the central opening 34 of the centrally open end well 26 is best explained with reference to FIGS. 4-9. Essentially, this feature is achieved by the special construction of the baffle screen 44 cooperating with the special construction of the central opening 34. As may be best observed in FIGS. 4 and 5, each of the pair of integral side shoulders 50,50 of the baffle screen 44 terminates at the bottom with a mounting member 54 bordered and essentially formed by an L-shaped cutout 56 in the side shoulders 50,50. Adjacent the L-shaped cutouts 56, the flat plate portion 48 of the baffle screen 44 is formed with an angular cut 58 on each side, and also is provided with a pair of lips 60,60 immediately in the back of the angular cuts 58. At their respective upper ends, the pair of integral side shoulders 50,50 are joined to the flat plate portion 48 with a depression 62. The depression 62 lies in the plane of the upper portion of the L-shaped cutout 56, both being designed to accommodate therein the thickness of the centrally open end wall 26 when the baffle screen 44 is in its normally closed portion illustrated in FIGS. 1 and 2.

The aforementioned parts of the baffle screen 44 are designed to cooperate with the specific design of the central opening 34 formed in the centrally open end wall 26, now to be described in detail. The bottom left and right corners of the central opening 34, bounded respectively by the bottom edge 38 and the left and right sides 40 and 42 thereof, are provided with H-shaped cutouts 64 and 66, respectively. Each of these H-shaped cutouts 64 and 66 communicates via a channel 68 and 70 with the bottom edge 38 of the central opening 34. It will be observed in FIG. 5 that the location of these H-shaped cutouts 64 and 66 with respect to the central opening 34 is different. Whereas the left side of the H-shaped cutout 68 is aligned with the left side 40 of the central opening 34, the right side of the H-shaped cutout 70 is not so aligned with the right side 42 of the central opening. Rather, and as illustrated, the right side of the H-shaped cutout 70 is parallel spaced therefrom by a distance 72, which distance 72 is about twice the width of the channel 70, with the parallel spaced part extending by a height 74 as indicated by an arrow. This height 74 is somewhat greater than the height of the H-shaped cutout 70, without the channel 70. The width of the central opening 34, as indicated by an arrow 76, is somewhat greater than the width of the baffle screen 44. As regards the respective heights, however, the situation is reversed. Here, the height of the baffle screen 44 exceeds that of the central opening 34. As a result, once the baffle screen 44 is in place in its illustrated normally closed position, as per FIGS. 1 and 2, the spring means 52 securely locks the baffle screen 44 in place, abutting the top and bottom edges 36 and 38 of the central opening 34 from the inside of the hollow interior 14 of the elongated container 12. In this respect, the situation is the same as illustrated in FIG. 12, although a somewhat different embodiment of a baffle screen is illustrated therein, as will be more fully described below.

Figure 6:
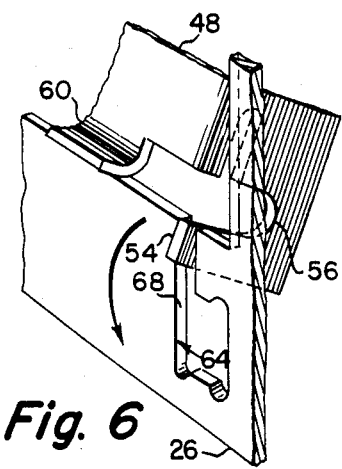
FIGS. 5-9 illustrate the mounting of the baffle screen in the improved fluid waste transporter, but on a larger scale still.
Figure 5:
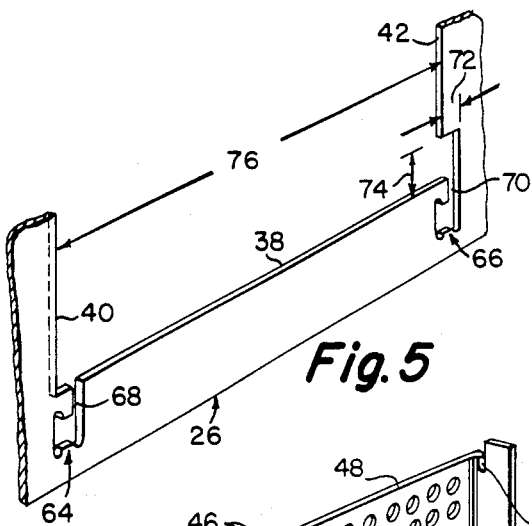
Figure 7:
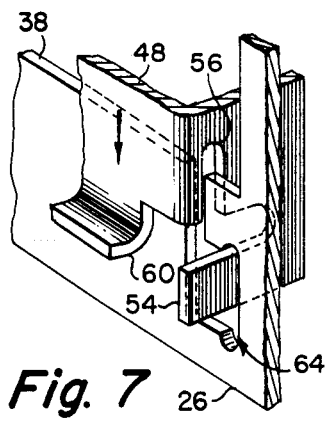
Figure 4:
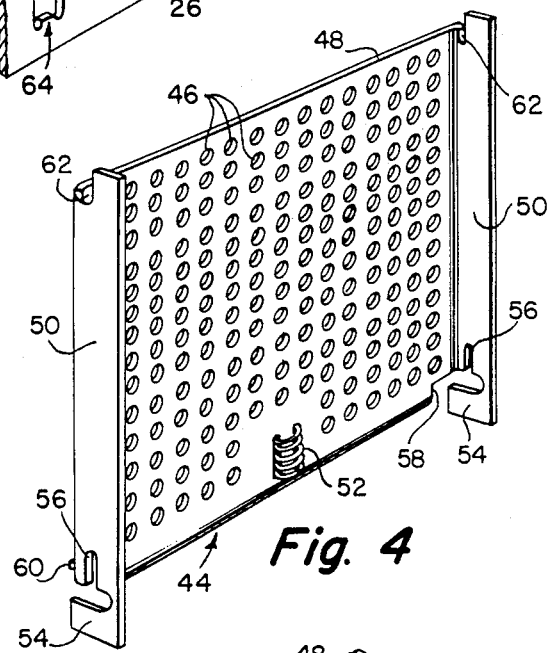
FIG. 4 is a perspective view of the baffle screen of FIGS. 1-3, but on a slightly larger scale.
Figure 8:
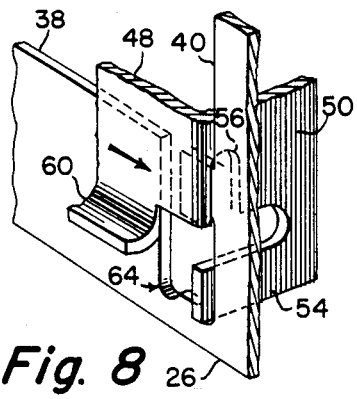
Figure 9:
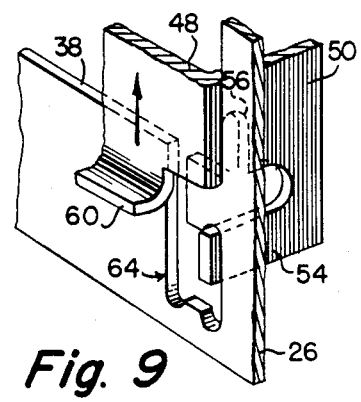

The insertion and mounting of the baffle screen 44 into the central opening 34 of the centrally open end wall 26 is illustrated in FIGS. 6-9. Holding the baffle screen 44 at an inclined angle, as shown in FIG. 6, the mounting members 54,54 are inserted in the respective channels 68,70 communicating with their respective H-shaped cutouts 64 and 64, observe FIG. 5. At least one of the pair of lips 60 is designed to glide over the bottom edge 38 to facilitate this process. Following the insertion of the mounting members 54,54, the baffle screen 44 is pushed downwardly, as shown in FIG. 7, until the mounting members 54,54 clear their respective channels 68 and 70 and find themselves in their respective H-shaped cutouts 64 and 66. Once there, the baffle screen 44 is moved sideways in the central opening 34 toward the left side 40 thereof until the left side shoulder 50 abuts thereagainst, observe FIG. 8. Now, upon the urging of the spring means 52 bearing against the bottom edge 38, the baffle screen 48 is pushed upward, as illustrated in FIG. 9, until it assumes its normally closed position, illustrated in FIGS. 1 and 2. Removal of the baffle screen 44 from within the central opening 34 is effected by reversing the steps just described above with reference to FIGS. 6-9.

If not removal of the baffle screen 44 is desired but rather positioning it pivotally into its second operative position, as illustrated in FIG. 3, the procedure is as follows. First, by grabbing hold of the pair of integral side shoulders 50,50, the baffle screen 44 is simply depressed within the central opening 34, overcoming the pressure of the spring means 52, until the top edge of the baffle screen 44 is clear and in front of the top edge 36 of the central opening 34. At this point, without displacing the baffle screen 44 sideways, the same is allowed once again to be pushed up and away from the bottom edge 38 by the action of the spring means 52. Then, by pulling the top end of the baffle screen 44 or the top ends of the pair of its integral side shoulders 50,50 forward, the baffle screen 44 is allowed to pivot forward essentially about the bottom edge 38, with the mounting members 54,54 remaining on the left side and within their respective H-shaped cutouts 64,66, as viewed in FIGS. 3 and 5. The L-shaped cutouts 56,56 cooperate with the H-shaped cutouts 64,66 to allow for this pivotal action of the baffle screen 44. When it is desired to return the baffle screen 44 to its normally closed position, the same is first pivoted backward and then depressed, allowing the top edge of the baffle screen 44 first to enter into the central opening 34 and then extend behind the centrally open end wall 26, so that the top edge 36 thereof will once again enter into the depressions 62,62 formed in the baffle screen 44.

In FIGS. 10–12, there is illustrated a second and somewhat simpler embodiment of a baffle screen 78 which is but removably located within a central opening 80 of the centrally open end wall 26. The differences in size and shape of the baffle screen 78 and its corresponding central opening 80 from those of the baffle screen 44 and its corresponding opening 34 are for the purpose of illustrating that such size variations are essentially customer dictated. The same is true of the size, shape and number of the perforations illustrated in the baffle screen 78 as contrasted with the perforations 46 shown in the baffle screen 44. The function, construction and mounting of the spring means 52 are identical in both embodiments. The baffle screen 78 also comprises a flat plate portion 82 and a pair of integral side shoulders 84,84. At the top, there are formed depressions 86,86 which are substantially identical to the depressions 62,62 of the baffle screen 44 in location, construction and function. A pair of like depressions 88,88 also are formed near the bottom of the baffle screen 78. These depressions 88,88 are alike the top portions of the L-shaped cutouts 56,56 of the baffle screen 44 in location, construction and function. All of these function to allow the respective top and bottom edges of the central opening in the centrally open end wall 26 to enter into these depressions 86 and 88 so as to securely lock, via the spring means 52, the respective baffle screen therein, observe FIGS. 11 and 12. There the similarity between the two illustrated embodiments of baffle screens 44 and 78 ends, however. The pair of integral side shoulders 84,84 simply feature a pair of top flaps 90,90 and a pair of bottom flaps 92,92. These flaps 90,90 and 92,92 are designed to facilitate the mounting and the removal 80 of the baffle screen 78.

In order to mount the baffle screen 78 within the central opening 80, one positions the bottom edge thereof thus that the bottom edge of the opening 80 in the centrally open end wall 26 enters into the depressions 88,88. Then by depressing the baffle screen 78 against the force of the spring means 52 until such time that its top edge clears the top edge of the opening 80, the baffle screen 78 is inserted into the opening 80. Once so inserted, further downward pressure against the spring means 52 is halted, whereupon the baffle screen 78 is allowed to rise within the opening 80, so as to assume its mounted closed operative position illustrated in FIG. 12. It will be observed that in this closed position, the flat plate portion 82 thereof abuts the top and bottom edges of the central opening 80 of the centrally open end wall 26, which edges respectively penetrate into the depressions 86,86 and 88,88, firmly anchoring the baffle screen 78 therein. Removal of the baffle screen 78 from the opening 80 is accomplished by simply reversing the above steps.

As illustrated in FIGS. 1–2, 10 and 13–14, the improved fluid waste transporter 10 of the invention is provided with a first handle 94 secured to the elongated container 12 adjacent the chute 28 thereof. Preferably, the first handle 94 is circular in cross section and made of wood, plastic or hard rubber or any convenient combination thereof. The handle 94 is mounted between the side walls 16 and 18 diametrically opposed to the reentrant lip 32 of the chute 28. When the waste transporter 10 is resting on the ground, as shown in FIG. 1, preferably the circumference of the handle 94 is off the ground a distance sufficient for an operator to be able to grab hold of it.

Figure 13:
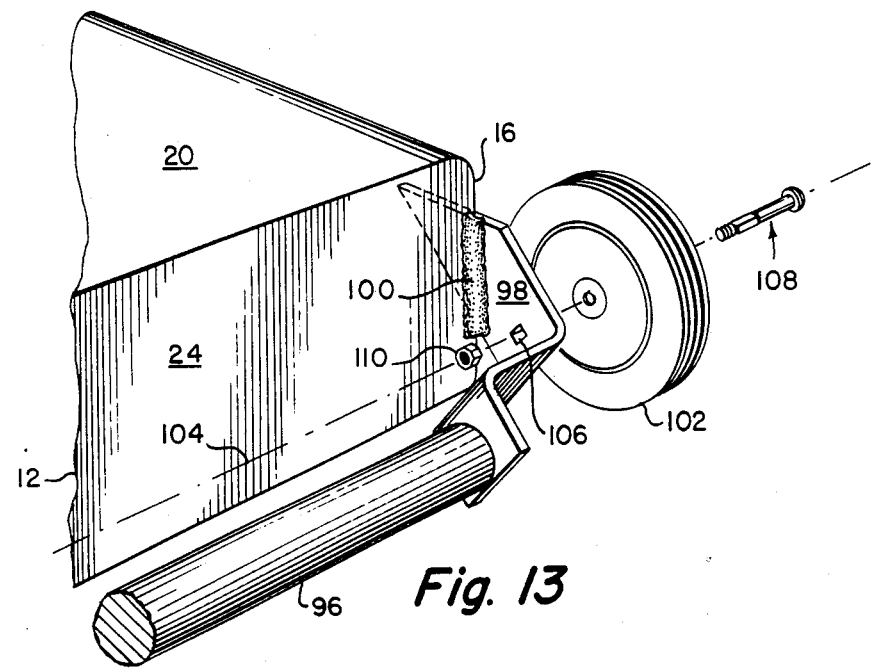
FIG. 13 is a fragmentary perspective and partly exploded view, on an enlarged scale, of the improved fluid waste transporter shown in FIG. 1 but viewed from its other end.

The fluid waste transporter 10 also is provided with a second handle 96 secured to the elongated container 12 adjacent its end wall 24, observe FIG. 13. Preferably, this second handle 96 is secured to the container 12 with the aid of a pair of mounting flanges 98, which are securely welded to the respective side walls 16 and 18, as at 100. Preferably, the weld extends along the entire length of the overlapping surfaces of the pair of mounting flanges 98. The pair of mounting flanges 98 also serve to anchor thereto a pair of wheels 102 about an axis 104 located in front of the end wall 24 such that the wheels' peripheries support the elongated container 12 at an inclined angle to ground toward the first handle 94.

In the embodiment illustrated in FIGS. 1 and 13, the pair of mounting flanges 98 are S-shaped in cross section, with the wider portions thereof welded to the sides 16 and 18 of the container 12, and the narrower portions thereof mounting the second handle 96 thereto. Due to these narrower portions, the handle 96 is somewhat shorter in length than the width of the solid end wall 24 of the container 12. The wider portions of the S-shaped mounting flanges 98 are provided with a mounting perforation 106 defining the mounting axis 104 of the wheels 102. Preferably, the mounting perforations 106 are angularly shaped, which may take the form of being square, as shown. An appropriately formed axle 108 is designed to mount the pair of wheels 102 thereto, with the aid of a securing nut 110. The axle 108 itself is non-rotatably secured in the mounting perforation 106. Preferably, the second handle 96, secured between the narrower portions of the pair of mounting flanges 98 by nuts and bolts, is of circular cross section and made either of wood, plastic, natural and synthetic rubber, or a combination thereof.

Figure 14:
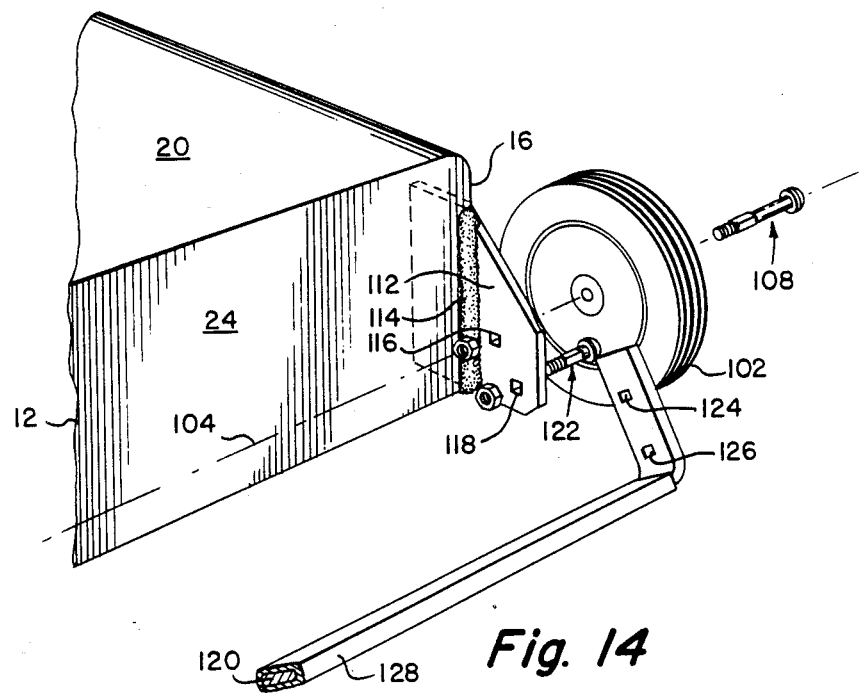
FIG. 14 is a view similar to FIG. 12 but illustrating a different wheel mounting thereof.

In the embodiment illustrated in FIG. 14, a pair of flat mounting flanges 112 are shown secured, as by being welded thereto at 114, to the sides 16 and 18 of the elongated container 12. These flat flanges 112 are each provided with a pair of spaced mounting perforations 116 and 118. Again each of these perforations 116 and 118 is angular in cross section, which may be a square as illustrated. One perforation 116 is designed to mount one of the pair of wheels 102 to the flange 112 with the aid of the axle 108, which is non-rotatably secured to the flange 112. The other perforation 118, in cooperation with the first perforation 116, is designed to secure to the flange 112 a U-shaped member 120, which serves as the second handle, via a second angularly shaped bolt 122. The U-shaped handle 120 also is provided with a pair of spaced mounting perforations 124 and 126, which are complementary in shape and location to the pair of perforations 116 and 118 formed in the flanges 112. Preferably, the U-shaped handle 120 is formed of a suitable metal, such as aluminum, stainless steel and the like. Preferably, the U-shaped handle 120 is of angular cross section and is provided with a cover 128 to enhance the grip thereon. This cover 128 can be formed of plastic, natural and synthetic rubber, and can be formed simultaneously with the handle 120 or the cover 128 can be subsequently mounted thereon. Preferably, the elongated metal container 12 has a minimum axial length of at least about 37 inches between its solid end wall 24 and the centrally open end wall 26, as shown by an arrow 130, observe FIG. 1. This minimum length is required when the chute acts as a fulcrum about which to pivot the container 12 so as to unload its contents into a tank, observe FIG. 5 of my said prior application, Ser. No. 051,718.

In order to accommodate a low entry spout, the improved fluid waste transporter 10 of the invention preferably also is provided with a fill slot 132 formed in one of the pair of side walls 16 or 18 in the chute 28 and in operative association with the central opening in the end wall 26. Preferably, the fill slot 132 extends to the level of the top wall 20 of the elongated container 12.

Thus it has been shown and described an improved fluid waste transporter 10 which enhances the safe handling, transporting and unloading of hot waste oils, fats, greases and the like which transporter 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. Fluid waste transporter comprising:
  (a) an elongated container having a hollow interior enclosed by walls on all sides, by a solid end wall at one end and by centrally open end wall at the other end, and provided with a chute at said other end, said chute being open at the top and in communication with said hollow interior via a central opening formed in said centrally open end wall;
  (b) a perforated partition replaceably mounted in said central opening of said centrally open end wall at said other end of said elongated container and in parallel spaced relation to said end wall, said perforated partition extending across a portion of said hollow interior and separating said hollow interior from said chute;
  (c) said chute provided with a fill slot in one of its sides and formed with a front side disposed at an angle to both said perforated partition and said end wall, the free edge of said front side terminating in a reentrant lip;
  (d) a first handle secure to said container adjacent said chute;
  (e) a second handle secured to said container adjacent its said end wall; and
  (f) a pair of wheels mounted to said container adjacent said second handle about an axis located in front of said end wall such that their peripheries in conjunction with said container adjacent said chute support said elongated container at an angle to ground downwardly inclined toward said first handle.

2. The fluid waste transporter of claim 1 wherein said chute extends beyond the confines of said container in a direction away from said first handle and wherein said fill slot extends along the length of said chute extension.

3. The fluid waste transporter of claim 1 wherein said replaceable perforated partition also is pivotally mounted in said centrally open end wall between a first closed position being parallel to said centrally open end wall and a second open position being at an angle thereto.

4. The fluid waste transporter of claim 3, wherein said central opening of said centrally open end wall is rectangular in shape with parallel opposed top and bottom edges and parallel opposed left and right sides, said bottom edge and said left and right sides forming respective left and right corners, each of said left and right corners provided with cutouts designed to mount replaceably and pivotally said perforated partition therein.

5. The fluid waste transporter of claim 4 wherein each of said cutouts is H-shaped in cross section and communicates via a channel with said bottom edge of said central opening.

6. The fluid waste transporter of claim 5, wherein the left side of said H-shaped cutout in said left corner is aligned with said left side of said central opening and wherein the right side of said H-shaped cutout in said right corner is parallel spaced from said right side of said central openings.

7. The fluid waste transporter of claim 6 wherein said replaceably and pivotally mounted perforated partition is formed with a flat plate portion and a pair of integral side shoulders projecting normal thereto, said flat plate portion provided with a plurality of perforations and with spring means to lock said perforated partition in its said first closed position.

8. The fluid waste transporter of claim 7 wherein said flat plate portion of said perforated partition, when in its said first closed position lies in plane which is parallel to but spaced from the plane defined by said centrally open end wall, and wherein said pair of integral side shoulders are formed with mounting means cooperating with said H-shaped cutouts of said centrally open end wall to mount said perforated partition therein replaceably and pivotally.

9. The fluid waste transporter of claim 8, wherein said mounting means formed in said pair of integral side shoulders comprises a mounting member bordered by an L-shaped cutout and, wherein said flat plate portion of said perforated portion is formed with an angular cut adjacent said mounting member.

10. The fluid waste transported of claim 1 wherein said pair of wheels are mounted to axles which are non-rotatably secured to said container.

11. The fluid waste transporter of claim 1 wherein said elongated container is provided with a pair of mounting flanges adjacent its said end wall, said flanges being designed both to mount said pair of wheels and said second handle to said container.

12. The fluid waste transporter of claim 11 wherein each of said pair of mounting flanges is provided with a pair of spaced mounting perforations, one of said pair of spaced mounting perforations is designed to receive one end of an axle for one of said pair of wheels and, the other of said pair of spaced mounting perforations is designed to receive means to secure said second handle thereto.

13. The fluid waste transported of claim 12 wherein at least one of said pair of spaced mounting perforations is angularly shaped in cross sections.

14. The fluid waste transporter of claim 13 wherein said one end of said axle for said pair of wheels is shaped complementary to said angularly shaped mounting perforation so as to be secured non-rotatably therein.

15. The fluid waste transporter of claim 12 wherein said second handle is a U-shaped member also provided with a pair of spaced perforations matching said pair of spaced mounting perforations of said mounting flanges.

16. The fluid waste transported of claim 15 wherein said U-shaped member is made from one of the group consisting of aluminum and stainless steel.

17. The fluid waste transporter of claim 16 when said U-shaped member is provided with a cover made from at least one of the group consisting of plastic, natural and synthetic rubber.

18. The fluid waste transporter of claim 11 wherein each of said pair of mounting flanges is shaped as an "S" in cross section.

19. The fluid waste transporter of claims 18 wherein wider spaced corresponding portions of each of said S-shaped pair of mounting flanges are secured to said elongated container and the narrower spaced corresponding portions thereof are designed to mount said second handle thereto.

20. The fluid waste transporter of claim 19 wherein each of said wider portions of said S-shaped pair of mounting flanges is provided with a mounting perforation for one of said pair of wheels.

21. The fluid waste transporter of claim 20 wherein said mounting perforation is angularly shaped in cross section.

22. The fluid waste transporter of claim 21 wherein said mounting perforation is designed to receive an axle for one of said pair of wheels and, wherein one end of said axle is shaped complementary to said angularly shaped mounting perforation so as to be secured non-rotatably therein.

23. The fluid waste transporter of claim 19 wherein each of said narrower portions of said S-shaped pair of mounting flanges is provided with a hole designed to receive means to secure said second handle between said narrower portions.

24. The fluid waste transporter of claim 23 wherein said second handle is of circular cross section and is made of at least one of a group consisting of wood, plastic, natural and synthetic rubber.

25. The fluid waste transporter of claim 1 wherein said elongated container has a minimum axial length of at least about 37" between its said end wall and said chute.

* * * * *